(No Model.)

W. B. HOHENSHELL.
NUT LOCK.

No. 383,810. Patented May 29, 1888.

WITNESSES.
J. S. Elliott.
E. M. Johnson.

Walter B. Hohenshell.
INVENTOR.

Attorney.

UNITED STATES PATENT OFFICE.

WALTER B. HOHENSHELL, OF STREATOR, ILLINOIS.

NUT-LOCK.

SPECIFICATION forming part of Letters Patent No. 383,810, dated May 29, 1888.

Application filed March 15, 1888. Serial No. 267,227. (No model.)

*To all whom it may concern:*

Be it known that I, WALTER B. HOHENSHELL, a citizen of the United States of America, residing at Streator, in the county of La Salle and State of Illinois, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention relates to certain new and useful improvements in that class of nut-locks in which bars are employed having slots and recesses for preventing the nuts turning upon the bolts, said bars having lips or projections which lie under the nuts and serve to hold the bars in place. The bars are connected to each other, so as to be contracted when it is desired to place the same upon the nut.

My invention consists, further, in the special construction and combination of the parts, as will be hereinafter fully set forth, and specifically pointed out in the claims.

Figure 1:
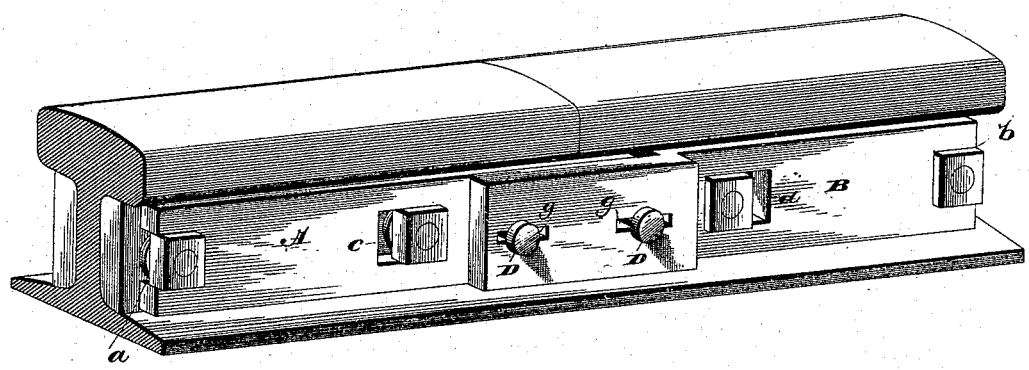
Figure 2:
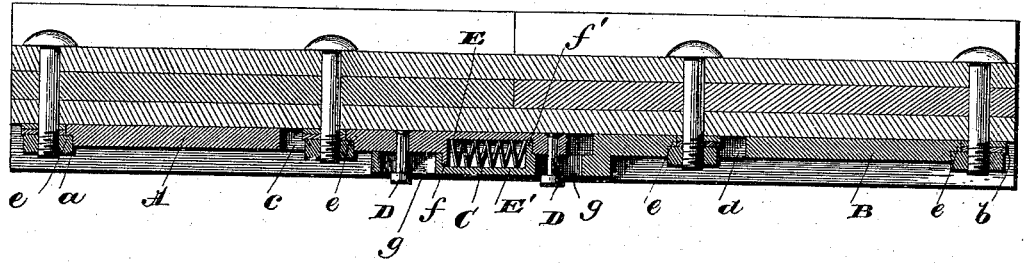

In the accompanying drawings, which illustrate my invention, Figure 1 is a perspective view, and Fig. 2 is a sectional view.

My improved nut-lock is composed, essentially, of the two parts A and B, a spring, C, and rivets D D for connecting the parts A and B to each other. The parts A and B are provided at their ends with recesses $a$ and $b$, and near their centers with slots $c$ and $d$. These slots and recesses are each provided with lips or flanges $e$, which are adapted to lie under the nuts of the bolt when the locking-plates are placed in position.

The inner end of the plate A is provided with a semicircular recess, E, and at one end of this recess is an outwardly-projecting lip, $f$, which extends above the outer edge of said locking-plate. On each side of these semicircular recesses E are perforations for the reception of one end of the rivets D D.

The inner end of the plate B is formed so as to project outwardly and lie over the end of the plate A, as shown, and this outwardly-projecting portion is provided with slots $g\ g$, and between said slots with a semicircular recess, E', one end of said recess having formed thereon an inwardly-projecting lip, $f'$. Within the recess is placed a spiral spring, C, the ends of which will bear upon the lips $f$ and $f'$ to normally press the parts A and B of the nut-lock apart, so that the lips $e$ will lie under the nuts and the recesses or slots $a\ b\ c\ d$ will bear against the edges of the nuts to prevent them from rotating upon the bolt.

The parts A and B of the nut-lock are held together by rivets or suitable connecting means which will prevent the ends becoming separated. Before the nuts are placed upon the bolts washers of substantially the same thickness as the lips $e$ and cut away on the side adjacent to said lips are placed upon the bolts.

The device hereinbefore described can be readily attached to a series of nuts by simply inserting one end of the same under one of the end nuts of the series, and then pressing upon the elevated end to compress the spring, in order that the slot and recess will lie over the other nut. When the device is parallel with the fish-plate and abutting thereagainst, the portions A and B will be sprung apart, so as to not only prevent the nuts from turning, but also hold the locking-plates securely in place.

I am aware that it is not broadly new to provide a locking device for nuts having separable parts which are expanded by a spring, as shown in Patent No. 363,196, and I do not claim such invention, broadly.

I claim—

1. In a nut-lock substantially as shown, the combination of a plate, A, provided with openings having on one edge adjacent thereto lips $e\ e$, said plate having a semicircular recess, a plate, B, having similar openings with lips and a raised end portion with semicircular recess and slots $g\ g$, a spring, C, contained within the recess, and means for securing the plates so that they may slide, substantially as shown, and for the purpose set forth.

2. The combination, in a nut-lock, of the following elements: the parts A and B, secured movably to each other and provided with semicircular recesses, said parts having projecting lips $f$ and $f'$, a spring located within said recesses to bear upon said lips, one of the parts being provided with slots and rivets for holding the parts together, so that they can slide one upon the other, the parts A and B being provided with openings with projecting lips $e$, substantially as shown, and for the purpose set forth.

In testimony whereof I affix my signature in presence of two witnesses.

WALTER B. HOHENSHELL.

Witnesses:
WM. DICUS,
A. P. WRIGHT.